UNITED STATES PATENT OFFICE.

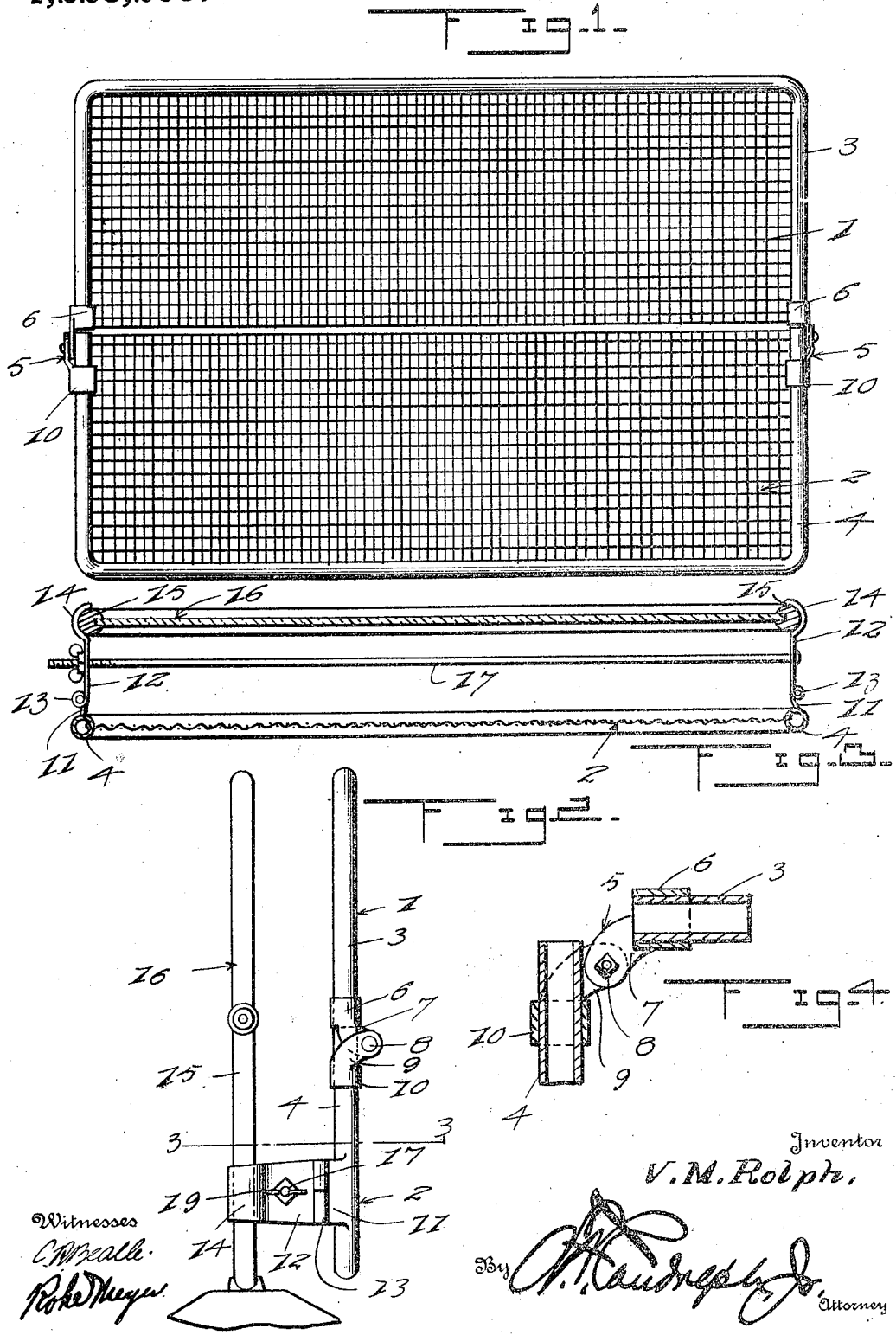

VERNE M. ROLPH, OF MAGNOLIA, MINNESOTA.

GUARD FOR WIND-SHIELDS.

1,223,205.　　　　　Specification of Letters Patent.　　Patented Apr. 17, 1917.

Application filed February 3, 1917. Serial No. 146,426.

*To all whom it may concern:*

Be it known that I, VERNE M. ROLPH, a citizen of the United States, residing at Magnolia, in the county of Rock and State of Minnesota, have invented certain new and useful Improvements in Guards for Wind-Shields; and I do hereby declare the following to be a full, clear, and exact description of the invention, such as will enable others skilled in the art to which it appertains to make and use the same.

This invention relates to a guard for automobile wind shields, and the primary object of the invention is to provide a guard, which is constructed of wire mesh or analogous material and one that may be quickly and easily attached to and positioned in front of an automobile wind shield for protecting the wind shield and preventing its being broken by flying missiles and particularly by base balls, when the occupant of the machine is desirous of watching a base ball game from his machine without endangering his wind shield or himself.

Another object of this invention is to provide a wind shield guard as specified, which is composed of a pair of hingedly connected sections, the hinges of which are arranged so that the upper section will move outwardly away from the lower section so as to accommodate the bending down or folding of the upper section of a wind shield proper.

With the foregoing and other objects in view, this invention consists in such novel features of construction, combination and arrangement of parts as will be hereinafter more fully described, illustrated in the accompanying drawing and claimed.

In describing the invention in detail reference will be had to the accompanying drawing wherein like characters designate like or corresponding parts throughout the several views, and in which:

Figure 1 is a front elevation of the improved wind shield guard.

Fig. 2 is an end elevation of the improved wind shield guard showing the same applied to a wind shield.

Fig. 3 is a section on the line 3—3 of Fig. 2.

Fig. 4 is a fragmentary section through the hinged connection between the upper and lower sections of the wind shield guard.

Referring more particularly to the drawings, 1 designates the upper section of the wind shield guard and 2 designates the lower section. The upper and lower sections 1 and 2 of the wind shield guard are constructed of suitable mesh material, such as wire or the like, and they have their outer edges bound by substantially U-shaped tubes 3 and 4. The ends of the tube 3 are positioned for alinement with and resting upon the upper ends of the tube 4, as clearly shown in Figs. 1 and 2 of the drawing, and these tubes, and consequently the sections 1 and 2 are connected by means of hinges generically indicated by the numeral 5.

The hinges 5 comprise collars 6 which are mounted upon the lower ends of the U-shaped tube 3 and which have arcuate ears 7 formed thereon and extending downwardly therefrom. The ears 7 are pivotally connected through the medium of bolts 8 with arcuate ears 9, which are formed upon and extend upwardly from collars 10. The collars 10 are mounted upon the upper ends of the tube 4, short distances downwardly from the terminals of the tube, as clearly shown in Figs. 1 and 4 of the drawing, so that when the upper section 1 is folded downwardly, it will be held outwardly in spaced relation to the lower section 2. The arcuate ears 7 and 9 curve outwardly beyond the outer edges of the tubes 3 and 4, as clearly shown in Fig. 2 of the drawing, so as to properly move the upper section 1 away from the lower section 2 when in a folded position.

The sides or legs of the U-shaped tube 4 have ears 11 formed integrally therewith, short distances upwardly from their lower ends. Clamping plates 12 are hingedly connected, as shown at 13, to the ears 11 and they have their outer ends curved, as shown at 14, for snugly fitting about the upstanding sides of the lower section 15 of an ordinary automobile wind shield 16. A rod 17 is carried by one of the plates 12 and extends through the other plate 12. The end 18 of the rod 17 is screw threaded and has a wing nut 19 mounted thereon. By the adjustment of the wing nut 19, the arcuate portions 14 may be brought into firm gripping and clamping engagement with the upstanding sides 15 of the wind shield 16 for securely connecting the guard structure to the wind shield and positioning it forwardly thereof, as clearly shown in Figs. 2 and 3 of the drawings.

In reducing the invention to practice, certain minor features of construction, combination and arrangement of parts may necessitate alterations to which the patentee is entitled provided such alterations are comprehended within the scope of what is claimed.

What is claimed is:

1. A guard for wind shields comprising an upper section and a lower section, means hingedly connecting said sections, and means carried by said lower section for attaching said guard to an ordinary motor vehicle wind shield.

2. A guard for motor vehicle wind shields comprising an upper section and a lower section, said sections being constructed of mesh material, substantially U-shaped tubes binding the outer edges of said sections, means hingedly connecting said tubes, and means carried by the tube which extends about the lower section for detachably attaching the guard in front of an ordinary motor vehicle wind shield.

3. A guard for motor vehicle wind shields comprising an upper section and a lower section constructed of foraminous material, tubes extending about and binding the outer edges of said sections, means for hingedly connecting said sections, ears formed upon the side tube of said lower section, clamping plates hingedly connected to said ears, and a rod extending through said clamping plates, a wing nut mounted upon one end of said rod for moving said clamping plates into clamping engagement with the side rods of an ordinary motor vehicle.

In testimony whereof I affix my signature in presence of two witnesses.

VERNE M. ROLPH.

Witnesses:
L. A. LOHR,
F. B. PETTINGILL.